United States Patent
Abe et al.

(10) Patent No.: US 12,494,702 B2
(45) Date of Patent: Dec. 9, 2025

(54) ELECTRIC POWER CONVERTER, METHOD OF CONTROLLING ELECTRIC POWER CONVERTER, AND COMPUTER READABLE RECORDING MEDIUM

(71) Applicant: FURUKAWA ELECTRIC CO., LTD., Tokyo (JP)

(72) Inventors: Asuka Abe, Tokyo (JP); Masahiro Rikiso, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 238 days.

(21) Appl. No.: 18/181,617

(22) Filed: Mar. 10, 2023

(65) Prior Publication Data

US 2023/0231462 A1     Jul. 20, 2023

Related U.S. Application Data

(63) Continuation of application No. PCT/JP2021/033342, filed on Sep. 10, 2021.

(30) Foreign Application Priority Data

Sep. 15, 2020   (JP) ................... 2020-154788

(51) Int. Cl.
    *H02M 1/00*        (2006.01)
    *H02J 1/10*        (2006.01)

(52) U.S. Cl.
    CPC .......... *H02M 1/0003* (2021.05); *H02J 1/102* (2013.01); *H02J 1/106* (2020.01)

(58) Field of Classification Search
    CPC ......... H02J 1/106; H02J 1/102; H02M 1/0003
    See application file for complete search history.

(56) References Cited

U.S. PATENT DOCUMENTS 11,133,673 B2    9/2021    Yamashita et al.
2017/0093205 A1    3/2017    Banno
(Continued)

FOREIGN PATENT DOCUMENTS

CN      110137997 A *   8/2019   ............. H02M 7/00
EP      3 309 952 A1      4/2018
(Continued)

OTHER PUBLICATIONS

Machine translation of CN 110137997 by Clarivate Analytics, Aug. 2025, 9 pages.*

(Continued)

*Primary Examiner* — Harry R Behm
(74) *Attorney, Agent, or Firm* — Oblon, McClelland, Maier & Neustadt, L.L.P.

(57) ABSTRACT

An electric power converter includes: an electric power conversion unit configured to convert electric power that has been input, and output the converted electric power; and a control unit configured to control, based on a reference function, an electric power conversion characteristic of the electric power conversion unit, wherein the reference function includes plural droop functions that have been defined according to input values, have drooping characteristics different from one another, and have been connected to each other, and the control unit is configured to control the electric power conversion characteristic by control schemes that are different from one another and are according to the drooping characteristics of the droop functions.

5 Claims, 8 Drawing Sheets

(56) References Cited

U.S. PATENT DOCUMENTS

| | | |
|---|---|---|
| 2017/0110880 A1 | 4/2017 | Chen et al. |
| 2018/0090984 A1 | 3/2018 | Ku et al. |
| 2018/0362181 A1 | 12/2018 | Iwashima et al. |
| 2019/0305562 A1 | 10/2019 | Begino, III et al. |
| 2020/0313565 A1* | 10/2020 | Mohamed Sayed Ahmed ............ H02M 7/125 |
| 2021/0004029 A1* | 1/2021 | Shirokov .................. H02J 1/12 |
| 2021/0175723 A1 | 6/2021 | Begino, III et al. |
| 2022/0094191 A1* | 3/2022 | Suzuki .................... H02J 1/102 |
| 2022/0278533 A1 | 9/2022 | Begino, III et al. |

FOREIGN PATENT DOCUMENTS

| | | | |
|---|---|---|---|
| GB | 2537684 A * | 10/2016 | ................ H02J 3/36 |
| JP | 2017-212785 A | 11/2017 | |
| JP | 2018-29408 A | 2/2018 | |
| JP | 6371603 B2 | 8/2018 | |
| JP | 2020-22331 A | 2/2020 | |
| WO | WO 2016/088189 A1 | 6/2016 | |
| WO | WO 2019/103059 A1 | 5/2019 | |

OTHER PUBLICATIONS

International Search Report issued Nov. 22, 2021 in PCT/JP2021/033342 filed on Sep. 10, 2021, 2 pages.
Extended European Search Report Issued Sep. 12, 2024 in European Application 21869304., 9 pages.

* cited by examiner

ELECTRIC POWER CONVERTER, METHOD OF CONTROLLING ELECTRIC POWER CONVERTER, AND COMPUTER READABLE RECORDING MEDIUM

This application is a continuation of International Application No. PCT/JP2021/033342, filed on Sep. 10, 2021 which claims the benefit of priority of the prior Japanese Patent Applications No. 2020-154788, filed on Sep. 15, 2020, the entire contents of which are incorporated herein by reference.

BACKGROUND

The present disclosure relates to an electric power converter, a method of controlling the electric power converter, an electric power system, a method of controlling the electric power system, and a computer readable recording medium.

Electric power networks using electric power locally produced for local consumption have attracted attention as alternative means of large scale electric power networks dependent on fossil energy and nuclear energy. Various devices, such as photovoltaic (PV) devices that are electric power generation devices that generate electric power by using renewable energy, stationary electric storage devices, and electric vehicles (EVs), are connected to electric power networks using electric power locally produced for local consumption. These various devices are direct current power sources, and studies on constructing direct current (DC) electric power networks (DC grids) are thus being conducted.

Methods of controlling a DC grid include a method in which an electric power converter connected to the above mentioned devices subjects these devices to constant current control or constant voltage control, based on instructions from a central control unit and thereby centrally controls the amount of electric power through the DC bus of the DC grid. This central control method enables simplified control of the whole DC grid but has a problem that smoothly dealing with rapid changes in supply and demand of electric power is difficult by this central control method. Furthermore, this central control method has a possibility of, for example, destabilization of voltage control and vibration of voltage through the DC bus when, in particular, constant voltage control is performed at plural points over a wide range. In addition, constant voltage control at plural points has a problem of being unable to share the load of electric power interchange by the devices, that is, being unable to supply electric power to the DC bus, from the devices in cooperation with one another and at a constant voltage, according to electric power supplying capabilities of the devices.

Therefore, the DC grid is controlled by: assigning a reference function to each electric power converter, the reference function being based on local electric power (P) and local voltage (V) at that electric power converter; and causing autonomous decentralized control (Japanese Patent No. 6371603, International Publication No. WO 2019/103059, and Japanese Unexamined Patent Application, Publication No. 2018-29408). In a case where a target voltage value is caused to have a drooping characteristic according to the amount of electric power required for the DC bus, that is, in a case where a reference function having a drooping characteristic is used, the control may be called droop control. Autonomous decentralized droop control of the electric power converters enables: the load of electric power interchange by the devices to be shared according to the amount of electric power required for the DC bus; and the voltage through the DC bus to be stabilized.

SUMMARY

When the reference function is formed of a single droop function having a single drooping characteristic, the droop coefficient is constrained to some extent for stability of electric power control. Therefore, achieving flexible control characteristics adaptable to various uses, for example, adapting to a demand for various load sharing characteristics, is difficult.

There is a need for an electric power converter, a method of controlling the electric power converter, an electric power system, a method of controlling the electric power system, and a computer readable recording medium storing a program that achieve flexible control characteristics adaptable to various uses.

According to one aspect of the present disclosure, there is provided an electric power converter including: an electric power conversion unit configured to convert electric power that has been input, and output the converted electric power; and a control unit configured to control, based on a reference function, an electric power conversion characteristic of the electric power conversion unit, wherein the reference function includes plural droop functions that have been defined according to input values, have drooping characteristics different from one another, and have been connected to each other, and the control unit is configured to control the electric power conversion characteristic by control schemes that are different from one another and are according to the drooping characteristics of the droop functions.

DETAILED DESCRIPTION

An embodiment of the present disclosure will be described hereinafter by reference to the drawings. The present disclosure is not limited by the embodiment described hereinafter. The same reference sign is assigned, as appropriate, to any portions that are the same, throughout the drawings.

First Embodiment

Configuration of Electric Power System

Figure 1:
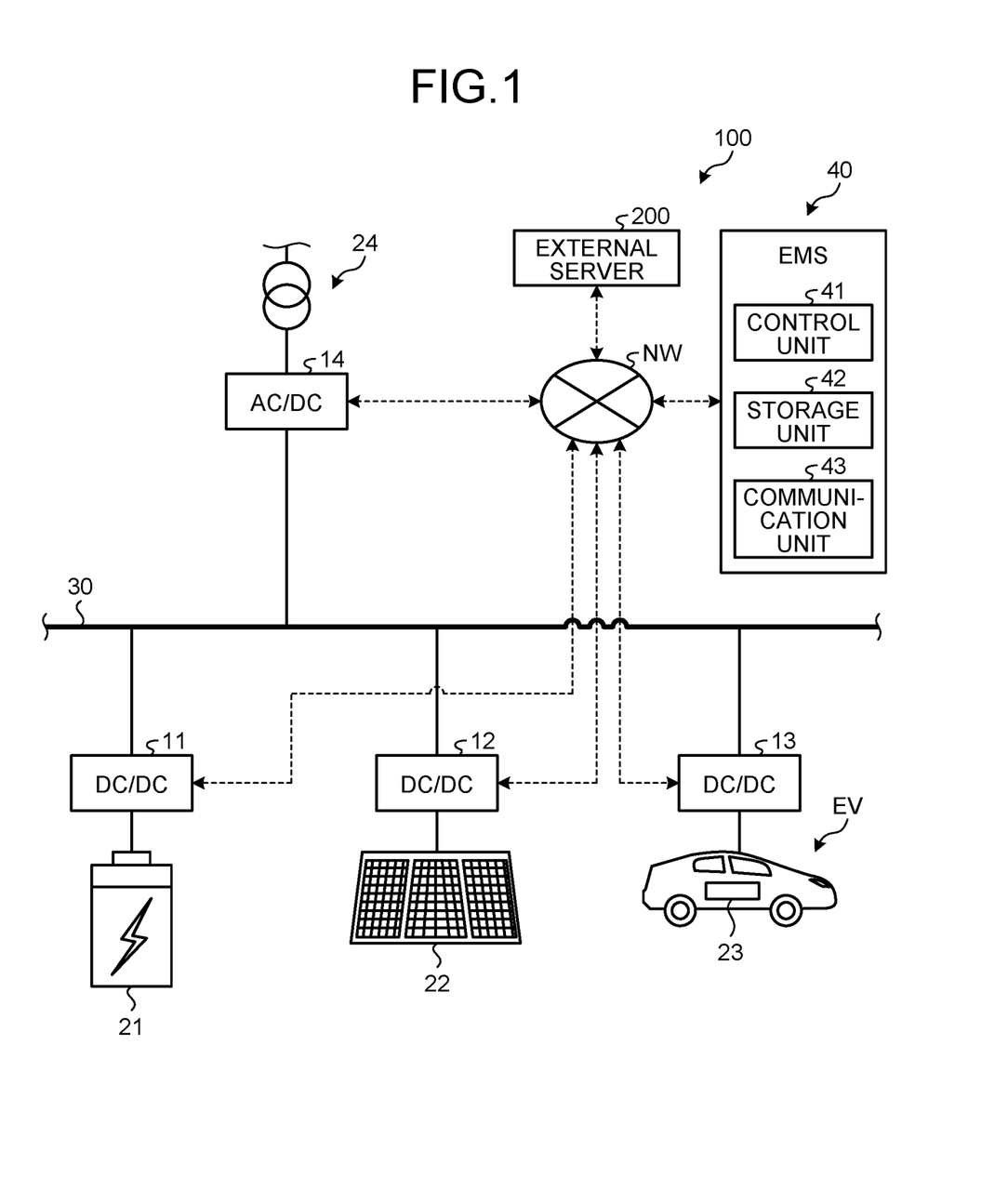
FIG. 1 is a diagram illustrating a configuration of an electric power system according to a first embodiment.

FIG. 1 is a diagram illustrating a configuration of an electric power system according to a first embodiment. An electric power system 100 includes plural electric power converters 11, 12, 13, and 14, plural electric power elements 21, 22, 23, and 24, and a bus 30. The electric power system 100 also includes an energy management system (EMS) 40. The EMS 40 is an example of a central control apparatus.

The electric power converters 11, 12, and 13 are DC/DC converters, and the electric power converter 14 is an AC/DC converter. The electric power converters 11, 12, 13, and 14 each have a function of communicating information by wire or wirelessly. Configurations and functions of the electric power converters 11, 12, 13, and 14 will be described in detail later.

The bus 30 is a DC bus in the electric power system 100, and is connected to the electric power converters 11, 12, 13, and 14. An electric power network including a DC grid is formed in the electric power system 100.

The electric power element 21 is, for example, a stationary electric storage device capable of supplying electric power, consuming electric power, and being charged with electric power, and is connected to the electric power converter 11. The stationary electric storage device is an example of an electric storage device permanently installed in a facility. The electric power converter 11 has a function of converting voltage of DC electric power supplied by the electric power element 21, outputting the converted voltage to the bus 30, converting voltage of DC electric power supplied from the bus 30, and outputting the converted voltage to the electric power element 21 to charge the electric power element 21.

The electric power element 22 is, for example, a photovoltaic device capable of generating and supplying electric power, and is connected to the electric power converter 12. This photovoltaic device is an example of an electric power generating device that generates electric power by using renewable energy. The electric power converter 12 has a function of converting voltage of DC electric power supplied by the electric power element 22 and outputting the converted voltage to the bus 30.

The electric power element 23 is, for example, an in-vehicle electric storage device capable of supplying electric power, consuming electric power, and being charged with electric power, and is connected to the electric power converter 13. The in-vehicle electric storage device is installed in an electric vehicle EV and is an example of a movable non-stationary electric storage device. The electric power converter 13 has a function of converting voltage of DC electric power supplied by the electric power element 23, outputting the converted voltage to the bus 30, converting voltage of DC electric power supplied from the bus 30, and outputting the converted voltage to the electric power element 23 to charge the electric power element 23. The electric power converter 13 is provided in, for example, a charging station or a residential charging facility, but may be installed in the electric vehicle EV.

The electric power element 24 is, for example, a commercial electric power system, and is connected to the electric power converter 14. The electric power converter 14 converts AC electric power supplied by the electric power element 24 into DC electric power, outputs the DC electric power to the bus 30, converts DC electric power supplied from the bus 30 to AC electric power, and outputs the AC electric power to the electric power element 24. Output of electric power from the bus 30 to the electric power element 24 is sometimes called a reverse power flow.

The EMS 40 has a function of performing integrated management of the state of the electric power system 100. The EMS 40 includes a control unit 41, a storage unit 42, and a communication unit 43.

The control unit 41 performs various kinds of arithmetic processing for implementing the function of the EMS 40, and includes, for example, a processor, such as a central processing unit (CPU), an application specific integrated circuit (ASIC), a field-programmable gate array (FPGA), a digital signal processor (DSP), or a graphics processing unit (GPU). Functions of the control unit 41 are implemented as functional units by the control unit 41 reading and executing various programs from the storage unit 42.

The storage unit 42 includes, for example, a read only memory (ROM) where various programs and data used by the control unit 41 to perform the arithmetic processing are stored. Furthermore, the storage unit 42 includes, for example, a random access memory (RAM): used as working space for the arithmetic processing by the control unit 41; and for storage of results of the arithmetic processing by the control unit 41. The storage unit 42 may include an auxiliary storage, such as a hard disk drive (HDD) or a solid state drive (SSD).

The communication unit 43 includes a communication module that performs communication of information by wire or wirelessly. The communication unit 43 performs communication of information with the electric power converters 11, 12, 13, and 14 and an external server 200, via a network NW that is, for example, an Internet network or a mobile phone network.

The external server 200 is a server provided outside the electric power system 100. The external server 200 is, for example, an information processing apparatus configured to function as an EMS in another electric power system, or an information processing apparatus that includes a database and functions as a data server for the EMS 40. The external server 200 stores various kinds of information that possibly have influences on operation of the electric power system 100.

Configuration of Electric Power Converter

Figure 2:
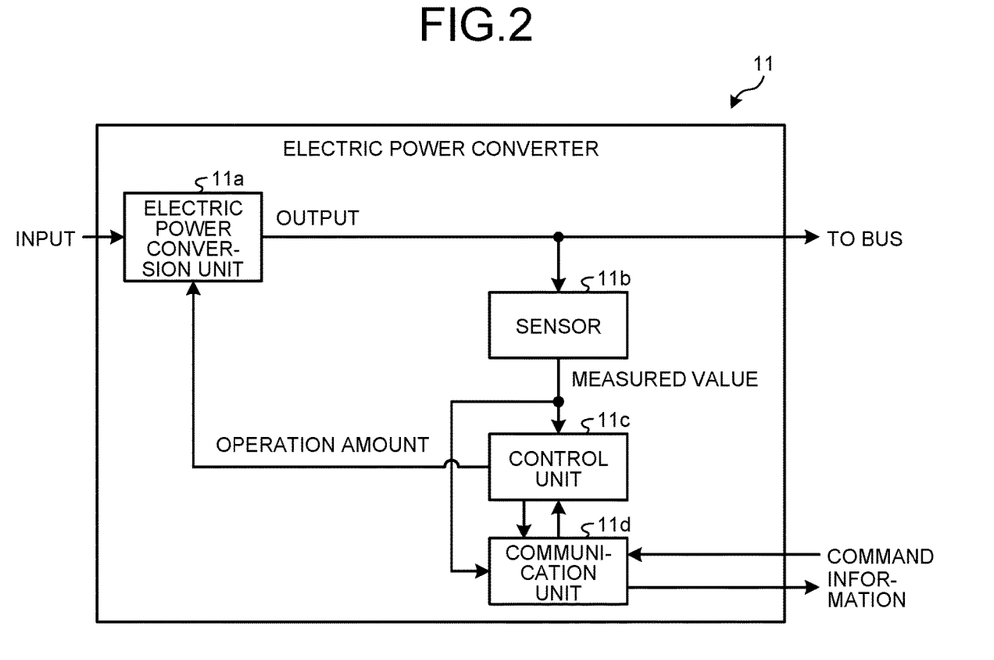
FIG. 2 is a diagram illustrating a configuration of an electric power converter illustrated in FIG. 1.

A specific configuration of the electric power converter 11 will be described next. FIG. 2 is a diagram illustrating a configuration of the electric power converter 11.

The electric power converter 11 has an electric power conversion unit 11a, a sensor 11b, a control unit 11c, and a communication unit 11d.

The electric power conversion unit 11a converts voltage of DC electric power input from the electric power element 21 that is being discharged, to perform DC/DC conversion for output to the bus 30. The electric power conversion unit 11a may convert voltage of DC electric power input from the bus 30 and output the converted voltage to the electric power element 21 to charge the electric power element 21. The electric power conversion unit 11a is formed of an electric circuit including, for example, a coil, a capacitor, a diode, and a switching element. The switching element is, for example, a field-effect capacitor or an insulated gate bipolar transistor. An electric power conversion characteristic of the electric power conversion unit 11a is able to be controlled by, for example, pulse width modulation (PWM) control.

The sensor 11b measures electric characteristic values of electric power of the electric power conversion unit 11a on the bus 30. Therefore, the sensor 11b measures electric characteristic values of electric power input to the electric power converter 11 or output from the electric power converter 11. The sensor 11b is capable of measuring, for example, an electric current value, a voltage value, and an electric power value. The sensor 11b is an example of a measurement unit that obtains a measured value. The sensor 11b outputs measured electric characteristic values to the control unit 11c.

For implementation mainly of an electric power conversion function of the electric power converter 11, the control unit 11c includes: a processor that performs various kinds of arithmetic processing for controlling operation of the electric power conversion unit 11a; and a storage unit. The examples mentioned above as the components of the control unit 41 and the storage unit 42 may be used respectively for the processor and the storage unit. Functions of the control unit 11c are implemented as functional units, by the processor reading various programs from the storage unit and executing the various programs read. For example, based on a reference function, the control unit 11c controls the electric power conversion characteristic of the electric power conversion unit 11a. Specifically, the control unit 11c outputs a PWM signal to the electric power conversion unit 11a to implement PWM control of the electric power conversion unit 11a, the PWM signal including information on an operation amount (for example, a duty ratio) for the PWM control. The control unit 11c may directly output the operation amount to the electric power conversion unit 11a, or may output the operation amount to the electric power conversion unit 11a via another functional unit (for example, a loop control unit) not illustrated in the drawings.

The communication unit 11d includes a communication module that communicates information by wire or wirelessly, and a communication control unit that controls operation of the communication module. The communication unit 11d communicates information with the EMS 40 via the network NW. For example, the communication unit 11d receives a command from the EMS 40 and outputs the command to the control unit 11c. The communication unit 11d transmits, for example, information related to an electric power status input from the control unit 11c, to the EMS 40. In a case where the information related to the electric power status is a measured value from the sensor 11b, the communication unit 11d may transmit, for example, the measured value input from the sensor 11b, to the EMS 40.

Figure 3:
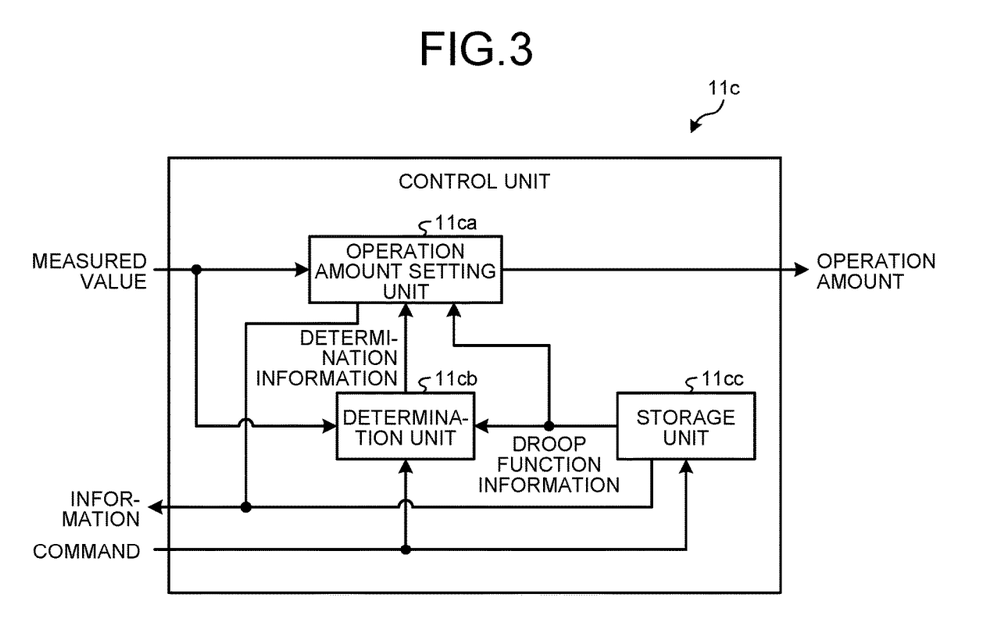
FIG. 3 is a diagram illustrating a configuration of a control unit illustrated in FIG. 2.

FIG. 3 is a diagram illustrating a configuration of the control unit 11c, the configuration being related mainly to the electric power conversion function. The control unit 11c includes: an operation amount setting unit 11ca and a determination unit 11cb that are functional units implemented as software by execution of programs; and a storage unit 11cc.

The operation amount setting unit 11ca sets an operation amount based on a measured value input from the sensor 11b, determination information input from the determination unit 11cb, and droop function information stored in the storage unit 11cc, and outputs the operation amount set, to the electric power conversion unit 11a. This droop function information is various kinds of information for determining droop functions forming the reference function and will be described in detail later. The determination unit 11cb generates the determination information based on the measured value input from the sensor 11b and the droop function information stored in the storage unit 11cc, and additionally in some cases, a command input from the communication unit 11d, and outputs the generated determination information to the operation amount setting unit 11ca. Furthermore, the storage unit 11cc or the operation amount setting unit 11ca outputs information, such as the information related to the electric power status or the droop function information, to the communication unit 11d.

The other electric power converters 12, 13, and 14 may each have a configuration similar to that of the electric power converter 11. However, an electric power conversion unit of the electric power converter 14 is a so-called inverter that converts AC electric power input from the electric power element 24 to DC electric power and outputs the DC electric power to the bus 30, and converts DC electric power input from the bus 30 into AC electric power and outputs the AC electric power to the electric power element 24.

Characteristics of Reference Function

Figure 4A:
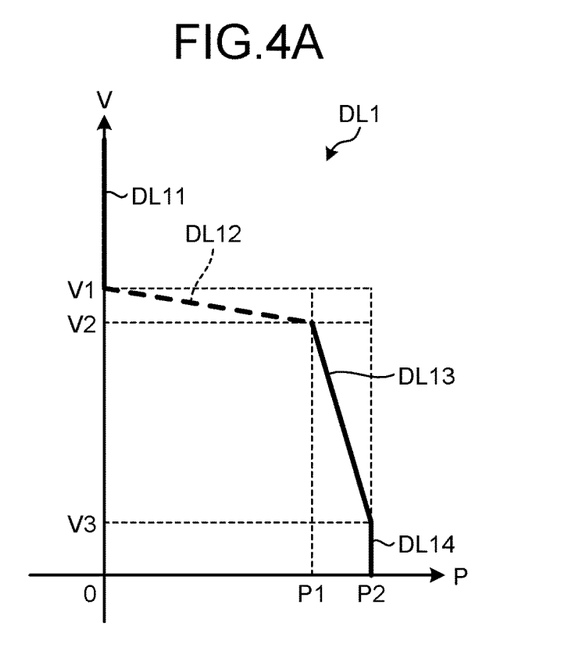
FIG. 4A is a diagram illustrating a first example of an electric power conversion characteristic.
Figure 4B:
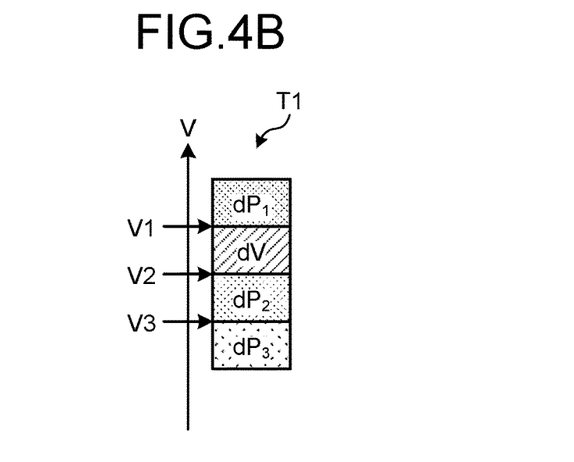
FIG. 4B is a diagram illustrating a first example of a logical value table representing control.
Figure 4C:
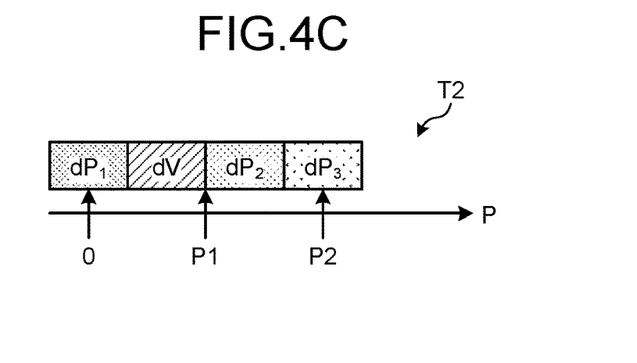
FIG. 4C is a diagram illustrating the first example of a logical value table representing control.

The reference function that serves as a basis for the control unit 11c to control the electric power conversion characteristic of the electric power conversion unit 11a will be described next. FIG. 4A is a diagram illustrating a first example of the electric power conversion characteristic and FIG. 4B and FIG. 4C are diagrams illustrating a first example of logical value tables representing control. FIG. 4A is a diagram illustrating a V-P characteristic that is a relation between electric power (P) and voltage (V) of the electric power conversion unit 11a on the bus 30 and illustrates the electric power conversion characteristic of the electric power conversion unit 11a. This P has a positive value in a case where the electric power element 21 is in a discharging state where the electric power conversion unit 11a supplies electric power to the bus 30, and has a negative value in a case where the electric power element 21 is in a charging state where electric power is supplied from the bus 30.

The control unit 11c performs control so that the electric power conversion characteristic of the electric power conversion unit 11a follows the characteristic of the reference function represented by a line DL1. That is, the control unit 11c controls the electric power conversion unit 11a so that an operation point defined by a value of V and a value of P is positioned on the line DL1. The line DL1 is a straight or curved line having bends in the middle. This reference function includes plural droop functions that have been defined according to intervals of input values, have drooping characteristics different from one another, and have been connected to each other. Specifically, the line DL1 includes lines DL11, DL12, DL13, and DL14: representing plural droop functions having drooping characteristics different from one another; and connected to each other. Where the input value is V, the line DL11: is defined by an interval where V is equal to or larger than V1 and P is approximately zero; and is an approximately straight line having a negative slope with a large absolute value. The line DL14: is defined by an interval where V is equal to or smaller than V3 and P is approximately P2; and is an approximately straight line having a negative slope with a large absolute value. The line DL12: is defined by an interval of V1 or smaller and V2 or larger, and approximately 0 or larger and P1 or smaller; and is an approximately straight line having a negative slope with an absolute value smaller than those of the lines DL11 and DL14. The line DL13: is defined by an interval of V2 or smaller and V3 or larger, and P1 or larger and approximately P2 or smaller; and is an approximately straight line having a negative slope with an absolute value smaller than those of the lines DL11 and DL14 and larger than that of the line DL12.

For example, P2 is 300 kW, and V1, V2, and V3 are respectively 400 V, 390 V, and 370 V.

The lines DL1, DL11, DL12, DL13, and DL14 are determined by the droop function information. The droop function information includes, for example, coordinate information on boundaries of droop functions at coordinates having P along the horizontal axis and V along the vertical axis, intercept information on the droop functions, information on slopes (that is, droop coefficients), and information on forms (a straight line or a curved line, for example). In a case where a droop function is a curve, the droop function is, for example, a quadratic curve or an exponential curve, but the curve is not particularly limited.

FIG. 4B illustrates an example of a logical value table T1 used when the control unit 11c performs control based on voltage. FIG. 4C illustrates an example of a logical value table T2 used when the control unit 11c performs control based on electric power. These logical value tables T1 and T2 are stored in, for example, the storage unit 11cc and read and used in the control.

In the logical value tables T1 and T2, "$dP_1$", "$dP_2$" and "$dP_3$" each mean that a control method is executed, and may hereinafter be referred to as $dP_1$ control, $dP_2$ control, and $dP_3$ control as appropriate or as dP control if they are not to be distinguished from one another, the control method being where the control unit 11c determines target electric power Pref (an example of a target value) based on a measured value Vo of voltage from the sensor 11b and droop function information and performs feedback control of setting an operation amount so that a difference between Pref and a measured value Po (an example of a control target value) of electric power from the sensor 11b becomes equal to or less than an acceptable range. Furthermore, "dV" means that a control method is executed, and may hereinafter be referred to as dV control as appropriate, the control method being where the control unit 11c determines a target voltage Vref (an example of a target value) based on a measured value Po of electric power from the sensor 11b and droop function information and performs feedback control so that a difference between Vref and a measured value Vo (an example of a control target value) of voltage from the sensor 11b becomes equal to or less than an acceptable range. These types of feedback control may be executed using a known technique, such as PID control executed by reading parameters, such as proportional gain, integral time, and derivative time that have been stored in the storage unit 11cc, for example. The parameters for these types of feedback control may be, for example, switched over by setting, as appropriate, parameters that enable more stable control, according to different pieces of droop function information (for example, different droop coefficients). For example, parameters for feedback control may be set differently for each of $dP_1$ control, $dP_2$ control, $dP_3$ control, and dV control. These dP control and dV control are an example of control schemes different from each other.

As the logical value tables T1 and T2 indicate, which control scheme of dP control and dV control is to be executed by the control unit 11c is selected according to drooping characteristics of droop functions. Specifically, according to the logical value table T1, when V is equal to or larger than V1, $dP_1$ control is selected, when V is less than V1 and equal to or larger than V2, dV control is selected, when V is less than V2 and equal to or larger than V3, $dP_2$ control is selected, and when V is less than V3, $dP_3$ is selected. Furthermore, according to the logical value table T2, when P is approximately zero, $dP_1$ control is selected, when P is larger than zero and equal to or less than P1, dV control is selected, when P is larger than P1 and less than P2, $dP_2$ control is selected, and when P is equal to or larger than P2, $dP_3$ control is selected.

The determination unit 11cb makes a determination of which control scheme of dP control and dV control is to be executed by the control unit 11c, based on a measured value input from the sensor 11b and droop function information stored in the storage unit 11cc. The determination unit 11cb outputs a result of this determination as determination information, to the operation amount setting unit 11ca and the operation amount setting unit 11ca sets an operation amount. According to drooping characteristics of droop functions, the types of electric characteristic values for a measured value, a control target value, and a target value have been selected at the control unit 11c. Specifically, in a case where the absolute value of a droop coefficient is equal to or larger than a predetermined value, a voltage value is selected as a measured value, electric power values are selected as a control target value and a target value, and dP control is executed. Furthermore, in a case where the absolute value of a droop coefficient is smaller than the predetermined value, an electric power value is selected as a measured value, voltage values are selected as a control target value and a target value, and dV control is executed. In the case of FIG. 4A, FIG. 4B, and FIG. 4C, for the lines DL11, DL13, and DL14, the absolute values of the droop coefficients are equal to or larger than a predetermined value and $dP_1$ control, $dP_2$ control, and $dP_3$ control that are each dP control are executed respectively. Furthermore, for the line DL12, the absolute value of the droop coefficient is smaller than the predetermined value and dV control is executed. In the dP control or later described dI control, the absolute value of the droop coefficient is comparatively large and virtual resistance is large, and susceptibility to line resistance is thus low and comparatively accurate load sharing is thus able to be achieved. On the contrary, in dV control, the absolute value of the droop coefficient is comparatively small and virtual resistance is small, and susceptibility to line resistance is thus high but the voltage range is able to be narrowed. Furthermore, the determination by the determination unit 11cb may be done by using any one or both of the logical value tables T1 and T2.

Furthermore, the control unit 11c may include a control block that is capable of selectively executing both dP control and dV control, for example. In addition, the control unit 11c may separately have a dP control block that executes dP control and a dV control block that executes dV control, for example. In this case, the control unit 11c may be configured so that the dP control block sets an operation amount for dP control, the dV control block sets an operation amount for dV control independently from the dP control block, and the operation amount for one of these types of control that is executed is output to the electric power conversion unit 11a through a switch.

The electric power converter 11 configured as described above enables flexible control characteristics adaptable to various uses based on a reference function having a high degree of freedom, because a reference function at the control unit 11c includes plural droop functions having drooping characteristics different from one another, the droop functions being connected to each other, and the control unit 11c controls the electric power conversion characteristic by control schemes different from one another according to the drooping characteristics of the droop functions.

Furthermore, in a case where the absolute value of the droop coefficient of a droop function is less than a predetermined value, the control unit 11c executes dV control, in a case where the absolute value of the droop coefficient is equal to or larger than the predetermined value, the control unit 11c executes dP control, appropriate control schemes are thus respectively used according to the drooping characteristics, and high responsiveness according to the drooping characteristics, high control performance, and high stability are thus able to be achieved at the same time.

As described above, the electric power converter 11 enables high control performance enabling loads to be shared in various ways because the reference function enables representation of various target values (droop functions) having various drooping characteristics. Therefore, constraints observed in a case where a central control method is implemented are eliminated, and the degree of freedom in representation by the reference function is improved, the central control method being where optimization of a system is performed and a droop function is generated at the EMS 40, for example. Furthermore, representation by a reference function enabling more accurate load sharing in consideration of the influence of line resistance, for example, is also enabled. In addition, by using the control schemes according to the droop coefficients so that in a case where the absolute value of the droop coefficient of a droop function is less than a predetermined value, dV control is executed, and in a case where the absolute value of the droop coefficient is equal to or larger than the predetermined value, dP control is executed; benefits of the respective control schemes are more preferably provided and stability and responsiveness of control are improved.

A control unit in each of the electric power converters 12, 13, and 14 performs control such that the electric power conversion characteristic of its electric power conversion unit follows the characteristic of the reference function set therefor. Each reference function includes plural droop functions that: have been defined according to intervals of input values; have drooping characteristics different from one another; and have been connected to each other. However, each reference function includes droop functions determined by appropriate droop function information according to the characteristic of the electric power converter 12, 13, or 14 and the characteristic of the electric power element 22, 23, or 24 connected thereto.

Furthermore, the control unit in each of the electric power converters 12, 13, and 14 controls the electric power conversion characteristic by control schemes according to the drooping characteristics of the droop functions, the control schemes being different from one another. This control is set and executed similarly to the control at the control unit 11c. As a result, flexible control characteristics adaptable to various uses are able to be achieved, appropriate control schemes are used according to the drooping characteristics, and high responsiveness according to the drooping characteristics, high control performance, and high stability are able to be achieved at the same time. In addition, control in the whole electric power system 100 is stabilized.

First Comparative Embodiment

Effects of the first embodiment will be described hereinafter in more detail by comparison with a first comparative embodiment. In the first embodiment and the first comparative embodiment, the bus 30 has an operating voltage range of 300 V to 400 V and a rated voltage of 380 V. In this case, in particular, for example, for the electric power converters 11, 13, and 14 of the electric power converters 11, 12, 13, and 14, their reference functions have drooping characteristics for sharing loads of electric power in the operating voltage range of the bus 30. In general, electric power converters operate efficiently at around their rated outputs (300 kW in these examples). It is supposed that in the operating voltage range, operation at around the rated output is maintained while the reference function has drooping characteristics. By contrast, in a range near the upper limit of the operating voltage range (for example, at 390 V to 400 V), it is supposed that the reference function has drooping characteristics in a narrow voltage range so that stability of the microgrid of the electric power system 100 is not affected.

Figure 5A:
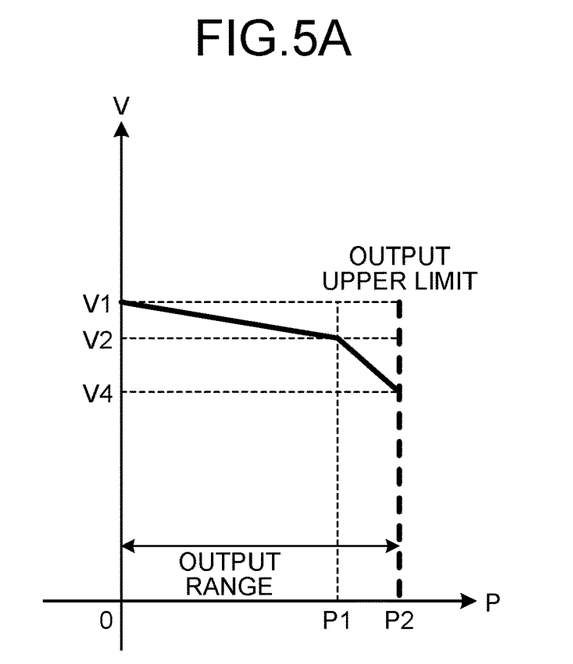
FIG. 5A is a diagram illustrating an example of an electric power conversion characteristic in a comparative embodiment 1A.
Figure 5B:
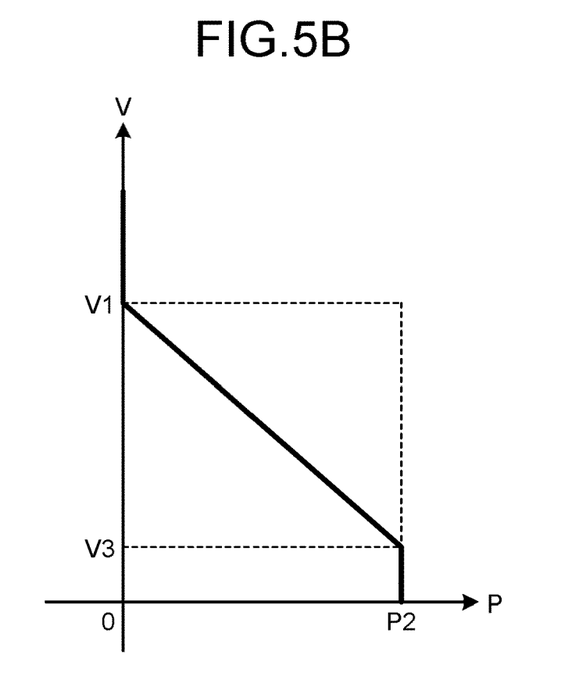
FIG. 5B is a diagram illustrating an example of an electric power conversion characteristic in a comparative embodiment 1B.

FIG. 5A is a diagram illustrating an example of an electric power conversion characteristic in a comparative embodiment 1A. FIG. 5A corresponds to the comparative embodiment 1A and illustrates a case where the absolute values of the droop coefficients of the reference function represented by a solid line are set smaller than a predetermined value and the control unit performs dV control only. FIG. 5B corresponds to a comparative embodiment 1B and illustrates a case where the absolute values of the droop coefficients of the reference function represented by a solid line are set larger than the predetermined value and the control unit performs dP control only. Herein, V1=400 V, V2=390 V, V3=300 V, V4=370 V, and P2=300 kW. That is, the upper limit of output of the electric power converter 11 is 300 kW that is also the rated output, and the range of output is 0 kW to 300 kW.

In the case of the comparative embodiment 1A, a drooping characteristic is able to be provided over a narrow voltage range in a voltage range of V1 to V2, that is, 390 V to 400 V, but the drooping characteristic is unable to be provided over a wide voltage range because the droop coefficients are unable to be made large. Therefore, a drooping characteristic is unable to be provided near the rated output at the operating voltage.

Furthermore, in the case of the comparative embodiment 1B, a drooping characteristic is able to be provided over a wide voltage range because the droop coefficients are able to be made large, but the drooping characteristic is unable to be provided over a narrow voltage range because the droop coefficients are unable to be made small. Therefore, a drooping characteristic is unable to be provided near the rated output.

In contrast, in the case of the first embodiment illustrated in FIG. 4A, FIG. 4B, and FIG. 4C, dV control for when the absolute value of the droop coefficient is equal to or smaller than a predetermined value is combined with dP control for when the absolute value is larger than the predetermined value, and operation near the rated output with a drooping characteristic in the operating voltage range is thus enabled and another drooping characteristic is also able to be provided over a narrow voltage range of 390 V to 400 V.

Another Example of Electric Power Conversion Characteristic

Figure 6:
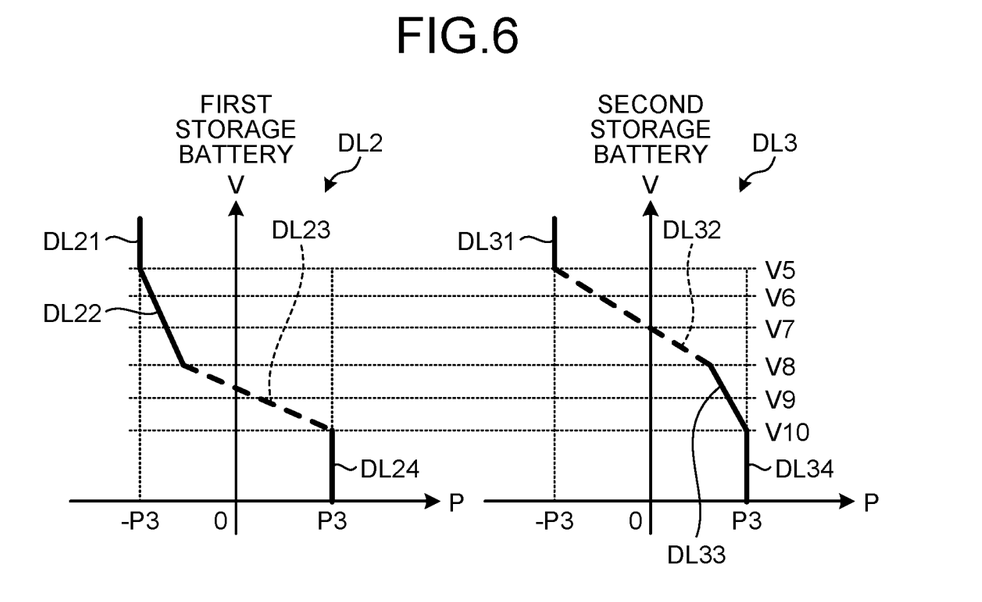
FIG. 6 is a diagram illustrating a second example of electric power conversion characteristics.

FIG. 6 is a diagram illustrating a second example of electric power conversion characteristics in the first embodiment. In this example, a case where the electric power elements 21 and 23 are two storage batteries (a first storage battery and a second storage battery) connected in parallel via a comparatively long line length is supposed. Furthermore, in this second example, the first storage battery is intended to be charged with a drooping characteristic over a wider range of the voltage range than the second storage battery.

In this second example, the control unit 11c of the electric power converter 11 performs control so that the electric power conversion characteristic of the electric power conversion unit 11a follows the characteristic of a reference function represented by a line DL2. This line DL2 includes lines DL21, DL22, DL23, and DL24 representing plural droop functions having drooping characteristics different from one another. Where the input value is V, the line DL21 is defined by an interval where V is equal to or larger than V5 and P is approximately −P3 and the line DL21 is an approximately straight line having a negative slope with a large absolute value. The line DL24 is defined by an interval where V is equal to or smaller than V10 and P is approximately P3 and the line DL24 is an approximately straight line having a negative slope with a large absolute value. The line DL22 is defined by an interval where V is equal to or smaller than V5 and equal to or larger than V8 and the line DL22 is an approximately straight line having a negative slope with an absolute value smaller than those of the lines DL21 and DL24. The line DL23 is defined by an interval where V is equal to or smaller than V8 and equal to or larger than V10, and the line DL23 is an approximately straight line having a negative slope with an absolute value smaller than those of the lines DL21, DL22, and DL24.

Furthermore, the control unit of the electric power converter 13 performs control so that an electric power conversion characteristic of an electric power conversion unit follows the characteristic of a reference function represented by a line DL3. This line DL3 includes lines DL31, DL32, DL33, and DL34 representing plural droop functions having drooping characteristics different from one another; and having been connected to each other. Where the input value is V, the line DL31 is defined by an interval where V is equal to or larger than V5 and P is approximately −P3 and the line DL31 is an approximately straight line having a negative slope with a large absolute value. The line DL34 is defined by an interval where V is equal to or smaller than V10 and P is approximately P3 and the line DL34 is an approximately straight line having a negative slope with a large absolute value. The line DL32 is defined by an interval where V is equal to or smaller than V5 and equal to or larger than V8 and the line DL32 is an approximately straight line having a negative slope with an absolute value smaller than those of the lines DL31 and DL34. The line DL33 is defined by an interval where V is equal to or smaller than V8 and equal to or larger than V10, and the line DL33 is an approximately straight line having a negative slope with an absolute value smaller than those of the lines DL31 and DL34 and larger than that of the line DL32.

For example, P3 is 300 kW, and V5, V6, V7, V8, V9, and V10 are respectively 400 V, 380 V, 360 V, 340 V, 320 V, and 300 V.

The lines DL2, DL3, DL21 to DL24, and DL31 to DL34 are determined by droop function information.

The logical value table used when the control unit 11c or the control unit of the electric power converter 13 performs control has been stored in a storage unit of each control unit, for example, and is read and used in the control. The logical value table has information prescribed therein, the information being for setting whether dV control is to be executed or dP control is to be executed.

Which control scheme of dP control and dV control is to be executed by each control unit is selected according to the drooping characteristics of the droop functions. For example, a determination unit of each control unit makes a determination of a control scheme based on a measured value input from a sensor and droop function information stored in a storage unit. The determination unit outputs a result of this determination as determination information, to an operation amount setting unit, and the operation amount setting unit sets an operation amount. According to the drooping characteristics of the droop functions, the types of electric characteristic values for a measured value, a control target value, and a target value have been selected at each control unit. In the case of FIG. 6, for the lines DL21, DL22, and DL24 corresponding to the first storage battery, the absolute values of the droop coefficients are equal to or larger than a predetermined value and dP control is thus executed, and for the line DL23, the absolute value of the droop coefficient is smaller than the predetermined value and dV control is thus executed. Furthermore, for the lines DL31, DL33, and DL34 corresponding to the second storage battery, the absolute values of the droop coefficients are equal to larger than a predetermined value and dP control is thus executed and for the line DL32, the absolute value of the droop coefficient is smaller than the predetermined value and dV control is thus executed.

In this second example also, flexible control characteristics adaptable to various uses are able to be achieved and high responsiveness, high control performance, and high stability are able to be achieved at the same time.

Second Comparative Embodiment

Effects of the second example will be described hereinafter in more detail by comparison with a second comparative embodiment. In the second example and the second comparative embodiment, it is supposed that a reference function having accurate load sharing in a charging direction of the first storage battery and the second storage battery is preferred for a comparative higher range (for example, 360 V to 400 V) of the operating voltage range. In a case where the line length is long, accurate load sharing is unable to be achieved unless the droop coefficient (=virtual resistance of the line) is large, and accurately sharing a load between the first storage battery and the second storage battery by use of a large droop coefficient is thus supposed. However, for a comparatively lower range (for example, 300 V to 360 V) of the operating voltage range, a case of biasing in the charging direction as much as possible and having a reference function falling within the operating range is supposed.

Figure 7:
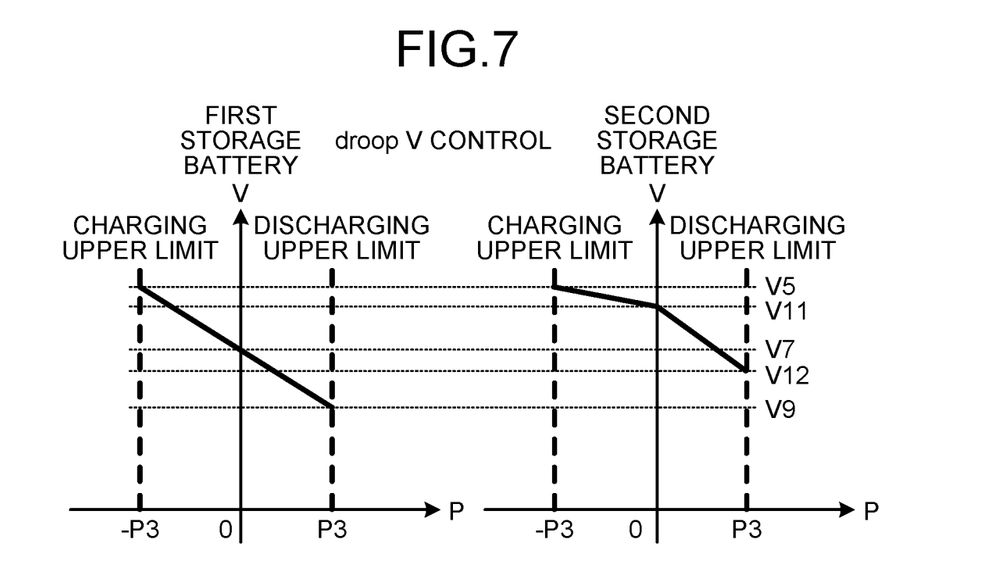
FIG. 7 is a diagram illustrating an example of electric power conversion characteristics in a comparative embodiment 2A.

FIG. 7 is a diagram illustrating an example of electric power conversion characteristics in a comparative embodiment 2A. The comparative embodiment 2A represents a case where the absolute values of droop coefficients of reference functions represented by solid lines are set smaller than a predetermined value and the control unit performs dV control only. Herein, V11=390 V and V12=350 V. The charging upper limit and discharging upper limit of the electric power converters 11 and 12 are both 300 kW.

In the case of the comparative embodiment 2A, due to the constraint of not being able to make the droop coefficients large, accurate load sharing is difficult. For example, in a case where the second storage battery has a line length longer than a line length of the first storage battery, load sharing where the droop of the second storage battery is large may be carried out. Furthermore, because the droop coefficients are unable to be made large, effective utilization of the operating voltage range (300 V to 400 V) may be impossible.

Figure 8:
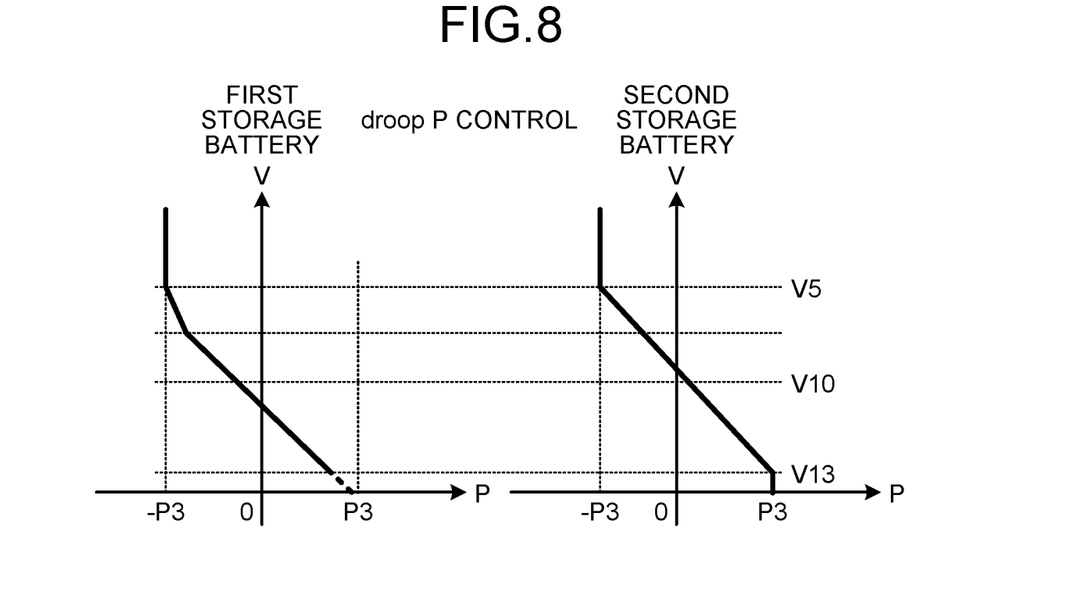
FIG. 8 is a diagram illustrating an example of electric power conversion characteristics in a comparative embodiment 2B.

FIG. 8 is a diagram illustrating an example of electric power conversion characteristics in a comparative embodiment 2B. The comparative embodiment 2B represents a case where the absolute values of droop coefficients of reference functions represented by solid lines are set equal to or larger than a predetermined value and the control unit performs dP control only. Herein, V13=200 V.

In the case of the comparative embodiment 2B, accurate load sharing is enabled because the droop coefficients are able to be made large. However, due to the constraint of not being able to make the droop coefficients small, the voltage fluctuation range may become too large.

Figure 9:
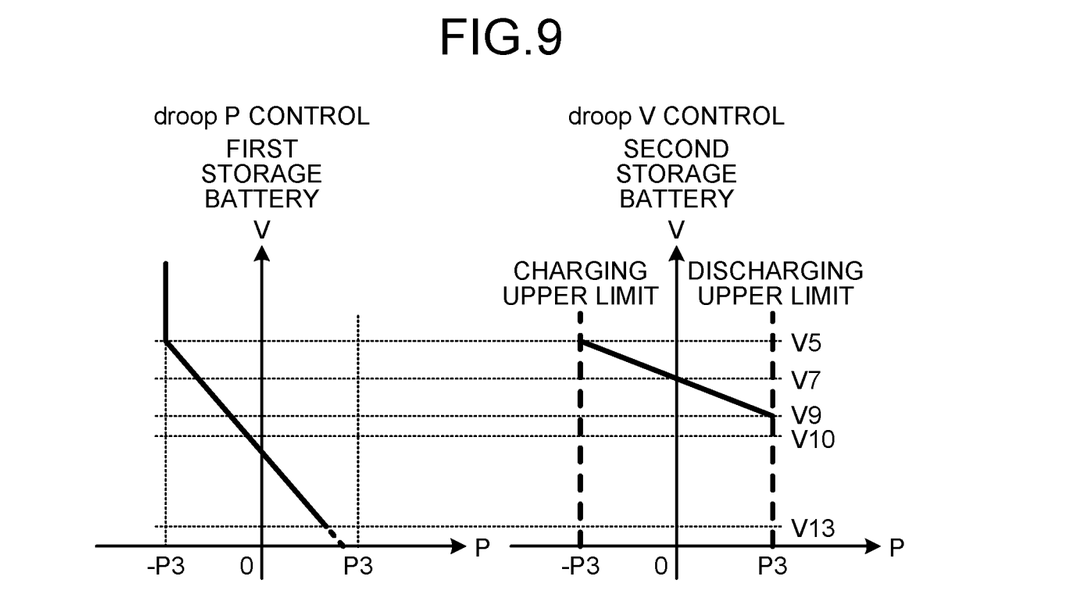
FIG. 9 is a diagram illustrating an example of electric power conversion characteristics in a comparative embodiment 2C.

FIG. 9 is a diagram illustrating an example of electric power conversion characteristics in a comparative embodiment 2C. This comparative embodiment 2C represents a case where the absolute values of droop coefficients of a reference function represented by a solid line are set equal to or larger than a predetermined value for the first storage battery and the control unit performs dP control only, and the absolute value of a droop coefficient is set smaller than the predetermined value for the second storage battery and the control unit performs dV control only. Herein, V13=200 V.

In the case of the comparative embodiment 2C, accurate load sharing is enabled in a comparatively higher range (360 V to 400 V) of the operating voltage range, but the first storage battery under dP control may deviate from the operating voltage range and the second storage battery may be unable to effectively use the operating voltage range effectively.

In contrast, in the case of the second example illustrated in FIG. 6, using a large droop coefficient in the range of 360 V to 400 V achieves accurate load sharing, and at the same time, being within the operating voltage range is enabled while applying a bias in the charging direction as much as possible in a comparatively lower range (for example, 300 V to 360 V) of the operating voltage range.

Control Method

A method of controlling the electric power converters 11, 12, 13, and 14 and a method of controlling the electric power system 100 will be described next. Types of control that may be executed in the electric power system 100 include: so-called local control where the electric power converters 11, 12, 13, and 14 individually perform autonomous decentralized control; and central control where the EMS 40 cooperatively controls the electric power converters 11, 12, 13, and 14 according to the electric power status of the electric power system 100. For example, local control is repeatedly executed on a comparatively short cycle, and central control is executed at longer intervals than the cycle of local control. Local control is also called primary control and central control is also called secondary control. A program causes a processor at each electric power converter or the EMS 40, for example, to execute these control methods.

Local Control

Firstly, a method of controlling the electric power converters 11, 12, 13, and 14 in local control will be described with respect to the electric power converter 11 serving as an example. A control method similar to that described hereinafter may be executed as appropriate at any of the other electric power converters 12, 13, and 14. In a case where the electric power element 22 is an element that does not control the amount of electric power generated in terms of efficiency, for example, like a photovoltaic device, control by the maximum power point tracking (MPPT) scheme may be executed, the control being where the electric power converter 12 is caused to operate such that in response to input of electric power corresponding to the amount of electric power generated by the electric power element 22 from the electric power element 22, the output electric power to the bus 30 is maximized at that amount of electric power generated.

In the method of controlling the electric power converter 11, the control unit 11c executes a control step of controlling the electric power conversion characteristic of the electric power converter 11, that is, the electric power conversion characteristic of the electric power conversion unit 11a, based on the reference function.

Figure 10:
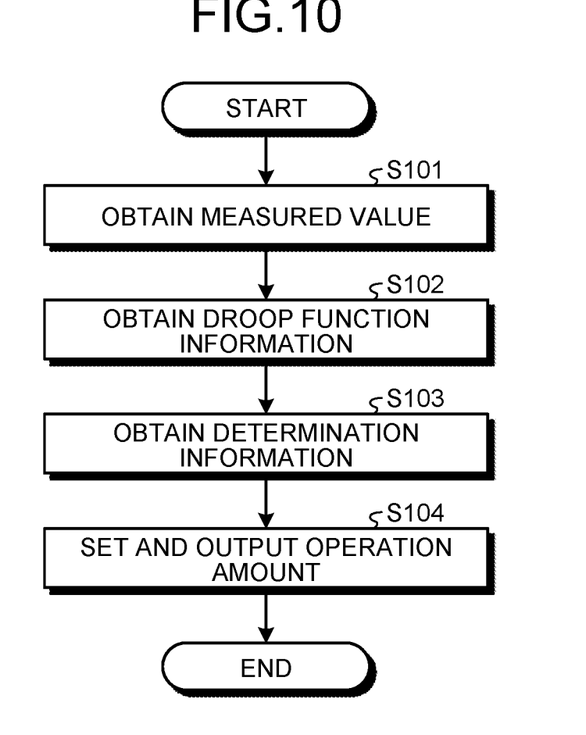
FIG. 10 is a flow diagram illustrating operation of an operation amount setting unit.

An example of this control step will be described more specifically by reference to FIG. 3 and FIG. 10. FIG. 10 is a flow diagram illustrating operation of the operation amount setting unit 11ca.

Firstly, at Step S101, the operation amount setting unit 11ca obtains a measured value from the sensor 11b. Subsequently, at Step S102, the operation amount setting unit 11ca obtains droop function information from the storage unit 11cc. Subsequently, at Step S103, the operation amount setting unit 11ca obtains determination information from the determination unit 11cb.

Subsequently, at Step S104, the operation amount setting unit 11ca sets, based on the measured value and droop function information, an operation amount for executing feedback control by a control method based on the determination information, and outputs the operation amount to the electric power conversion unit 11a. Control of the electric power conversion unit 11a is thereby executed.

Central Control

Central control will be described next. In the following example, the EMS 40 provided outside the electric power converters 11, 12, 13, and 14 executes central control by switching over or updating, through commands, reference functions used by the electric power converters 11, 12, 13, and 14 in control. Switching over reference functions through a command means that a storage unit in each of the electric power converters 11, 12, 13, and 14 stores plural reference functions and the reference functions to be used in control are switched over by the command. Furthermore, updating a reference function through a command means that the command includes information related to the reference function, and part of the reference function or the whole reference function is updated by the command. The storage unit of each of the electric power converters 11, 12, 13, and 14 stores the reference functions in a switchable or updatable manner.

For example, in a case where communication of information between the EMS 40 and the electric power converters 11, 12, 13, and 14 follows the TCP/IP protocol, the data portion of the IP packet of a command signal for updating a reference function includes droop function information. As described above, the droop function information is coordinate information on boundaries of droop functions, intercept information on the droop functions, information on the slopes (that is, the droop coefficients), or information on the shape (a straight line or a curved line, for example), and the data portion includes, as a data string, any piece of information to be updated, of these pieces of information. The droop function information used for the update has been stored in the storage unit 42 of the EMS 40 and the control unit 41 reads and uses the droop function information therefrom as appropriate.

Figure 11:
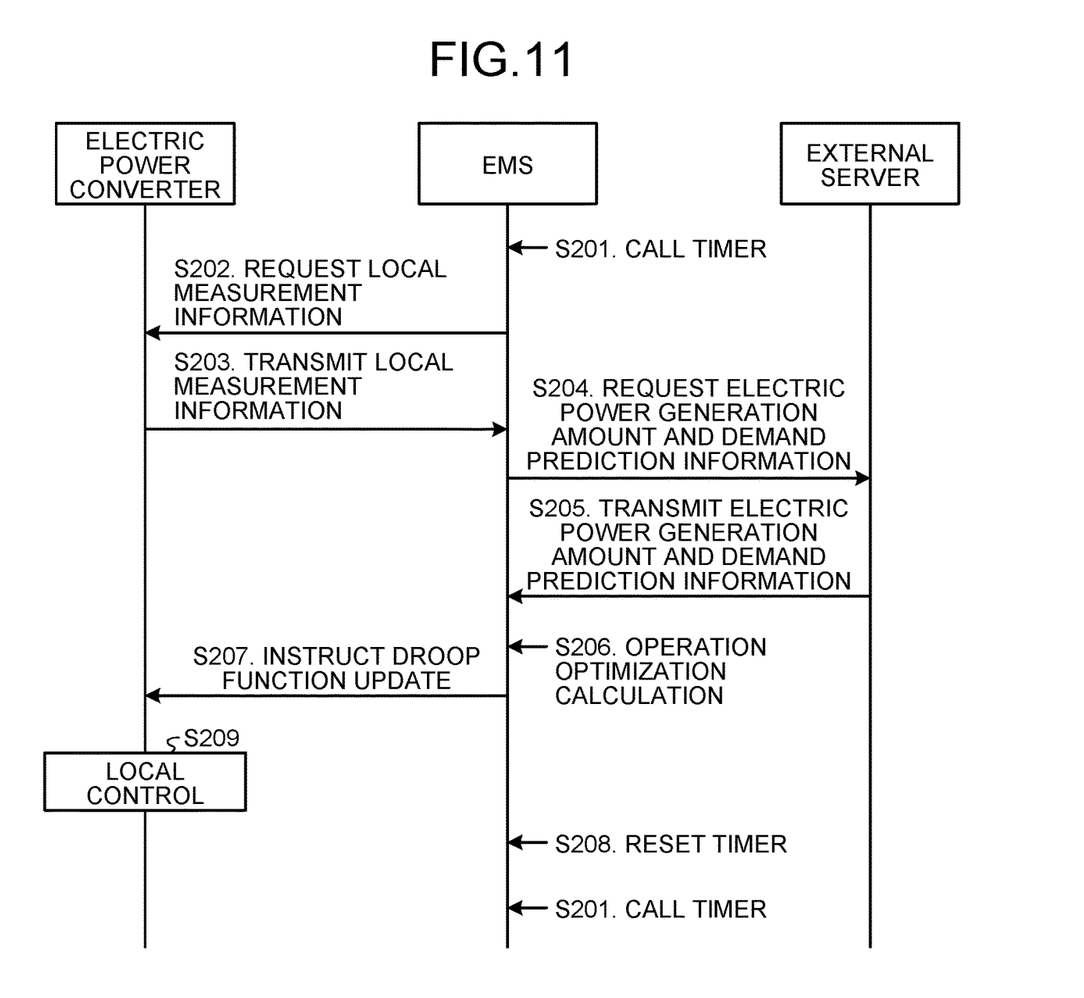
FIG. 11 is a sequence diagram illustrating an example of a method of controlling the electric power system.

An example of a method of controlling the electric power system 100, the method being central control, will be described next by reference to a sequence diagram in FIG. 11.

Firstly, at Step S201, the EMS 40 calls a timer in the EMS 40 to start timekeeping.

Subsequently, at Step S202, the EMS 40 requests each of the electric power converters 11, 12, 13, and 14 for local measurement information. The local measurement information is an example of information related to the electric power status of the electric power system 100, and includes a measured value measured by a sensor in each of the electric power converters 11, 12, 13, and 14 and a measurement time.

Subsequently, at Step S203, each of the electric power converters 11, 12, 13, and 14 transmits the local measurement information to the EMS 40. The EMS 40 stores the local measurement information into the storage unit 42.

Subsequently, at Step S204, the EMS 40 requests the external server 200 for various kinds of information that possibly influence operation of the electric power system 100, the various kinds of information being an example of information related to the electric power status of the electric power system 100. In this example, the EMS 40 requests the external server 200 for electric power generation amount and demand prediction information. This electric power generation amount and demand prediction information includes prediction information on the amount of electric power generated and prediction information on the demand for electric power in the electric power system 100, and may include, for example, information on the season, current weather, and future weather forecast in or for the region where the electric power system 100 is installed. Furthermore, in a case where the external server 200 functions as an EMS of another electric power system, if the operation state of that other electric power system has a possibility of influencing the operation of the electric power system 100, the electric power generation amount and demand prediction information may include prediction information on the amount of electric power generated and prediction information on the demand for electric power both in the other electric power system.

Subsequently, at Step S205, the external server 200 transmits the electric power generation amount and demand prediction information to the EMS 40. The EMS 40 stores the electric power generation amount and demand prediction information, into the storage unit 42.

Subsequently, at Step S206, the control unit 41 of the EMS 40 reads each piece of information that has been transmitted, that is, for example, the information related to the electric power status of the electric power system 100, from the storage unit 42, and executes, based on the pieces of information read, operation optimization calculation for the electric power system 100.

The operation optimization calculation is executed for application to various conditions. For example, it is assumed that the electric power system 100 is controlled so that the bus 30 serves as an operating point of a predetermined voltage. It is supposed that in this state, the EMS 40: has predicted, from the electric power generation amount and demand prediction information, that the future weather in the region where the electric power element 22, which is a photovoltaic device, is installed is going to be sunny and the amount of electric power generated is going to increase; and has determined that the electric power element 22 may afford to supply electric power, from the local measurement information obtained from the electric power converter 12 connected to the electric power element 22. In this case, the EMS 40 determines that the reference function of the electric power converter 11 connected to the electric power element 21 is to be updated so that the electric power element 21 that is a stationary electric storage device will be charged at the operating point. Furthermore, the EMS 40 determines that the reference function of the electric power converter 14 connected to the electric power element 24 is to be updated simultaneously with the above update so that electric power is not supplied from the electric power element 24 that is a commercial electric power system. The reference function may be switched over, instead of being updated.

Furthermore, the operation optimization calculation may be executed by setting conditions for not exceeding the contracted electric power of the electric power element 24 that is a commercial electric power system and for making the electricity price appropriate, like for peak cutting or utilization of nighttime electric power, for example.

Furthermore, the storage unit 42 of the EMS 40 may store a trained model and the EMS 40 may execute the operation optimization calculation using the trained model. The trained model that may be used, for example, is a trained model generated by deep learning using a neural network, with training data that are information related to electric power statuses of the electric power system 100 and results of switching and updating of the reference functions for the electric power converters 11, 12, 13, and 14 corresponding to the information.

Subsequently, at Step S207, the EMS 40 outputs a command for update of the reference function (droop functions) to one of the electric power converters 11, 12, 13, and 14, the one being a target of the update, and executes an updating step. Subsequently, at Step S208, the EMS 40 resets the timer. Subsequently, at Step S209, the electric power converters 11, 12, 13, and 14 each execute local control. Their local control is local control reflecting the electric power status of the electric power system 100 and the electric power converters 11, 12, 13, and 14 are thus cooperatively controlled.

The above described method of controlling the electric power converters 11, 12, 13, and 14 and method of controlling the electric power system 100 achieve flexible control characteristics adaptable to various uses.

In the above described embodiment, electric current values instead of electric power values may be used as electric characteristic values, such as measured values, target values, and control target values. In this case, for example, a reference function is defined as a V-I characteristic that is a relation between electric current (I) and voltage (V). Furthermore, for example, feedback control is also called dI control and is executed instead of dP control, or in combination with dP control, the feedback control being where based on a measured value Vo of voltage from the sensor 11b and droop function information, the control unit 11c determines target electric current Iref (an example of a target value), and sets an operation amount so that a difference between Iref and a measured value Io (an example of a control target value) of electric current from the sensor 11b becomes equal to or less than an acceptable range. In addition, in dV control, a target voltage Vref is determined based on the measured value Io of electric current from the sensor 11b and the droop function information. These dP control, dV control, and dI control are an example of control schemes different from one another, and these are used in combination as appropriate.

Furthermore, in the above described embodiment, a reference function includes four droop functions connected to each other, but a reference function may include 2, 3, 5, or more droop functions connected to each other.

Furthermore, the present disclosure is not limited by the above described embodiment. Those configured by combination of the components described above as appropriate are also included in the present disclosure. In addition, further effects and modifications may be easily derived by those skilled in the art. Therefore, wider aspects of the present disclosure are not limited to the above described embodiment, and various modifications are possible.

The present disclosure is able to be used for an electric power converter, a method of controlling the electric power converter, an electric power system, and a method of controlling the electric power system.

The present disclosure enables implementation of an electric power converter, a method of controlling the electric power converter, an electric power system, and a method of controlling the electric power system that achieve flexible control characteristics adaptable to various uses.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric power converter comprising:
    an electric power conversion unit configured to convert electric power that has been input, and output the converted electric power;
    a control unit configured to control, based on a reference function, an electric power conversion characteristic of the electric power conversion unit, wherein
        the reference function includes plural droop functions that have been defined according to input values, have drooping characteristics different from one another, and have been connected to each other, and
        the droop functions include a line defined by an interval where a voltage of the power conversion unit on a bus is equal to or larger than a predetermined value and a power of the power conversion unit on the bus is approximately zero, the line being a substantially straight line having a negative slope with a large absolute value, and
        the control unit is configured to control the electric power conversion characteristic by control schemes that are different from one another and are according to the drooping characteristics of the droop functions; and
    a measurement unit configured to obtain a measured value of an electric characteristic value of the electric power that has been input or that is output, wherein the control unit is configured to;
        control the electric power conversion characteristic, based on: a control target value of the electric characteristic value based on the measured value; and a target value of the electric characteristic value based on the reference function,
        select types of electric characteristic values of the measured value, the control target value, and the target value, according to the drooping characteristics of the droop functions,
        execute feedback control of a voltage value by selecting an electric power value or an electric current value as the measured value and selecting voltage values as the control target value and the target value in a case where an absolute value of a droop coefficient of the droop function is smaller than a predetermined value, and
        execute feedback control of an electric power value or an electric current value by selecting a voltage value as the measured value and selecting electric power values or electric current values as the control target value and the target value in a case where the absolute value of the droop coefficient is equal to or larger than the predetermined value.

2. The electric power converter according to claim 1, wherein the reference function is switched over or updated based on a command from outside.

3. The electric power converter according to claim 1, comprising:
    a storage unit configured to store the reference function in a switchable or updatable manner.

4. A method of controlling an electric power converter, the method comprising:
    controlling an electric power conversion characteristic of the electric power converter, based on a reference function, wherein
        the reference function includes plural droop functions that: have been defined according to input values; have drooping characteristics different from one another; have been connected to each other, and the droop functions include a line defined by an interval where a voltage of the power conversion unit on a bus is equal to or larger than a predetermined value and a power of the power conversion unit on the bus is approximately zero, the line being a substantially straight line having a negative slope with a large absolute value, and
        at the controlling, the electric power conversion characteristic is controlled by control schemes that are different from one another and are according to the drooping characteristics of the droop functions; and
    obtaining a measured value of an electric characteristic value of the electric power that has been input or that is output, wherein at the controlling comprises:
        controlling the electric power conversion characteristic based on: a control target value of the electric characteristic value based on the measured value; and a target value of the electric characteristic value based on the reference function,
        selecting types of electric characteristic values of the measured value, the control target value, and the target value, according to the drooping characteristics of the droop functions, executing feedback control of a voltage value by selecting an electric power value or an electric current value as the measured value and selecting voltage values as the control target value and the target value in a case where an absolute value of a droop coefficient of the droop function is smaller than a predetermined value, and executing feedback control of an electric power value or an electric current value by selecting a voltage value as the measured value and selecting electric power values or electric current values as the control target value and the target value in a case where the absolute value of the droop coefficient is equal to or larger than the predetermined value.

5. A non-transitory computer-readable recording medium on which an executable program causing a processor of a computer to execute:

controlling an electric power conversion characteristic of the electric power converter, based on a reference function, wherein the reference function includes plural droop functions that: have been defined according to input values; have drooping characteristics different from one another; and have been connected to each other, and the droop functions include a line defined by an interval where a voltage of the power conversion unit on a bus is equal to or larger than a predetermined value and a power of the power conversion unit on the bus is approximately zero, the line being a substantially straight line having a negative slope with a large absolute value, and the electric power conversion characteristic is controlled by control schemes that are different from one another and are according to the drooping characteristics of the droop functions and obtaining a measured value of an electric characteristic value of the electric power that has been input or that is output, wherein at the controlling comprises:

controlling the electric power conversion characteristic based on: a control target value of the electric characteristic value based on the measured value; and a target value of the electric characteristic value based on the reference function, selecting types of electric characteristic values of the measured value, the control target value, and the target value, according to the drooping characteristics of the droop functions, executing feedback control of a voltage value by selecting an electric power value or an electric current value as the measured value and selecting voltage values as the control target value and the target value in a case where an absolute value of a droop coefficient of the droop function is smaller than a predetermined value, and executing feedback control of an electric power value or an electric current value by selecting a voltage value as the measured value and selecting electric power values or electric current values as the control target value and the target value in a case where the absolute value of the droop coefficient is equal to or larger than the predetermined value.

\* \* \* \* \*